(12) United States Patent
Na et al.

(10) Patent No.: US 8,518,254 B2
(45) Date of Patent: Aug. 27, 2013

(54) COOLANT DEMINERALIZER FOR A FUEL CELL VEHICLE

(75) Inventors: Sung Wook Na, Gyeonggi-do (KR); Seong Kyun Kim, Seoul (KR); Sung Ho Lee, Gyeonggi-do (KR); Hee Seok Jeong, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 535 days.

(21) Appl. No.: 12/787,944

(22) Filed: May 26, 2010

(65) Prior Publication Data

US 2011/0129753 A1 Jun. 2, 2011

(30) Foreign Application Priority Data

Dec. 2, 2009 (KR) ............ 10-2009-0118221
Dec. 2, 2009 (KR) ............ 10-2009-0118228

(51) Int. Cl.
*B01D 24/08* (2006.01)
(52) U.S. Cl.
USPC ........... 210/282; 210/289; 210/291; 210/441; 210/448; 210/450; 210/453; 210/456; 210/458; 210/502.1
(58) Field of Classification Search
USPC ............ 210/282, 286, 289, 291, 441, 456, 210/210/263, 315–317, 342, 448, 450, 453, 210/455, 457, 458, 502.1
See application file for complete search history.

(56) References Cited

U.S. PATENT DOCUMENTS

| 2,028,520 | A | * | 1/1936 | Phillips | 210/300 |
| 5,106,501 | A | * | 4/1992 | Yang et al. | 210/266 |
| 2005/0115884 | A1 | * | 6/2005 | Suzuki et al. | 210/282 |
| 2006/0141329 | A1 | | 6/2006 | Fink et al. | |
| 2006/0175262 | A1 | * | 8/2006 | Martin | 210/670 |

FOREIGN PATENT DOCUMENTS

| JP | 63-065910 A | 3/1988 |
| JP | 2005-161117 A | 6/2005 |
| JP | 2006-228472 A | 8/2006 |
| JP | 2007-296419 A | 11/2007 |
| JP | 2009-142713 A | 7/2009 |
| KR | 10-2006-0114700 | 11/2006 |

* cited by examiner

*Primary Examiner* — Matthew O Savage
(74) *Attorney, Agent, or Firm* — Edwards Wildman Palmer LLP; Peter F. Corless

(57) ABSTRACT

The present invention provides a coolant demineralizer for a fuel cell vehicle, which removes ions, released from a pipe, from coolant of a fuel cell stack. In preferred embodiments, the present invention provides a coolant demineralizer suitably configured to reduce the occurrence of differential pressure due to an ion resin layer such that coolant can smoothly flow through a filter member, thereby increasing the effect of filtering ions and improving the efficiency of use of ion resin.

12 Claims, 14 Drawing Sheets

PRIOR ART

PRIOR ART

PRIOR ART

PRIOR ART

PRIOR ART

PRIOR ART

PRIOR ART

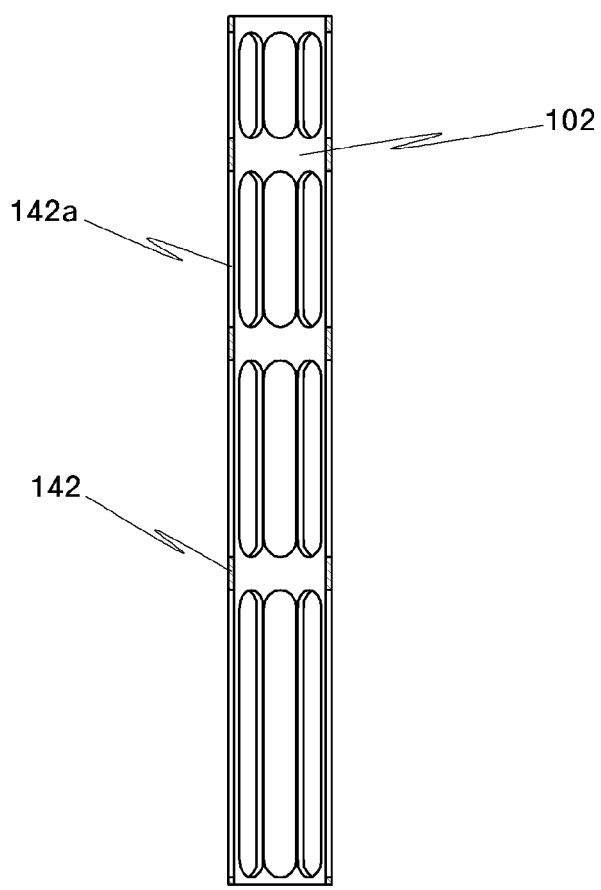

COOLANT DEMINERALIZER FOR A FUEL CELL VEHICLE

CROSS-REFERENCE TO RELATED APPLICATION

This application claims under 35 U.S.C. §119(a) the benefit of Korean Patent Application Nos. 10-2009-0118221 and 10-2009-0118228 filed Dec. 2, 2009, the entire contents of which are incorporated herein by reference.

BACKGROUND (a) Technical Field

The present disclosure relates, generally, to a coolant demineralizer for a fuel cell vehicle. More particularly, it relates to a coolant demineralizer for a fuel cell vehicle, which removes released ions from coolant of a fuel cell stack.

(b) Background Art

A fuel cell system employed in a hydrogen fuel cell vehicle as an environment-friendly vehicle comprises a fuel cell stack for generating electricity by an electrochemical reaction of reactant gases, a hydrogen supply system for suitably supplying hydrogen as a fuel to the fuel cell stack, an air supply system for suitably supplying oxygen-containing air as an oxidant required for the electrochemical reaction in the fuel cell stack, a thermal management system for suitably removing reaction heat from the fuel cell stack to the outside of the fuel cell system, controlling operation temperature of the fuel cell stack, and performing water management function, and a system controller for controlling the overall operation of the fuel cell system.

In the above configuration, the fuel cell stack suitably generates electrical energy by the electrochemical reaction of hydrogen and oxygen as reactant gases and discharges heat and water as by-products of the reaction. Accordingly, a system for cooling the fuel cell system to prevent the temperature rise of the fuel cell stack is necessarily required in the fuel cell system.

Preferably, in a typical fuel cell system for a vehicle, a water cooling system for circulating water through a coolant channel in the fuel cell stack is used to cool the fuel cell stack, thus maintaining the fuel cell stack at an optimal temperature.

An exemplary configuration of the cooling system of the fuel cell vehicle is shown in FIG. 1. FIG. 1 is a schematic diagram of a coolant loop of the fuel cell vehicle, which comprises a coolant line 3 disposed between a fuel cell stack 1 and a radiator 2 to circulate coolant, a bypass line 4 and a three-way valve 5 for bypassing the coolant so as not to pass through the radiator 2, and a pump 6 for pumping the coolant.

The applicable materials for pipes, which constitute the coolant loop of the fuel cell system, are limited due to ion release, and include, for example, SUS316L, Teflon, AI 3003, Food-Grade silicon, and the like which have low release rate. Further, it is not possible to use SUS304 due to ion release.

When cheap materials are used, impurities and ions are released from the material which is in contact with the coolant. As a result, the electricity generated from the fuel cell stack may flow through the coolant, which can be problematic.

Further, when the ion conductivity of the coolant is increased by the material used in the fuel cell vehicle, which moves while generating electricity and carrying a driver and passengers, electricity may flow through the coolant loop, which makes it very difficult for the electrical devices and driving components, mounted in the vehicle, to normally operate and further causes a serious danger to the driver and passengers.

As a result, the electrical conductivity of the coolant in the fuel cell vehicle is measured at all times, and a control logic for shutting down the fuel cell system when the electrical conductivity is increased to a predetermined level is employed.

Moreover, a demineralizer 7 is provided in the coolant loop to maintain the ion conductivity of the coolant below a predetermined level.

Preferably, the demineralizer 7 serves to reduce the ion conductivity below a predetermined level by filtering ions contained in the coolant flowing through the fuel cell stack 1.

FIG. 2 is a perspective view of a conventional demineralizer, FIG. 3 is a longitudinal cross-sectional view of FIG. 2, and FIG. 4 is a diagram showing a differential pressure region (in which an ion resin is filled) in the conventional demineralizer.

The demineralizer 100 typically comprises a housing 110 through which coolant is passed, an inlet port 120 and an outlet port 130 through which the coolant is introduced and discharged, an ion resin 101 filled in the housing 110 to filter ions contained in the coolant, and mesh assemblies 140a and 140b for supporting the ion resin 101 filled in the housing 110 and preventing the ion resin 101 from leaking.

In the above configuration, the mesh assemblies 140a and 140b serve to suitably pass the coolant and entrap the ion resin 101 in the form of small grains in the housing 110. Preferably, the mesh assemblies 140a and 140b are suitably provided at both the inlet port 120 and the outlet port 130 at both ends of the housing 110 to prevent the ion resin 101 filled in the housing 110 from leaking.

In the demineralizer 100 having the above-described configuration, the coolant introduced through the inlet port 120 (connected to an output of a pump) passes through the mesh assembly 140a, the ion resin 101, and the mesh assembly 140b and is then suitably discharged through the outlet port 130 (connected to an input of the pump) and, while the coolant passes through the ion resin 101, ions are filtered and removed.

The removal of ions from the coolant makes it possible to suitably prevent current leakage from the fuel cell stack, and thereby improve the electrical safety of the vehicle to meet the standard.

However, in the conventional demineralizer 100 shown in FIG. 3, the coolant flows through the longitudinal path between the inlet port 120 and the outlet port 130, and the region, in which the ion resin 101 is filled, along the longitudinal path corresponds to a region in which a difference in coolant pressure (differential pressure) occurs between the inlet side and the outlet side.

As a result, the coolant passing through the region in the longitudinal (axial) direction increases the differential pressure region in the demineralizer (the region in the longitudinal direction in which the ion resin is filled in FIG. 3), and thus a considerable difference in pressure occurs between the coolant introduced through the inlet port and the coolant discharged through the outlet port.

FIG. 5 is a graph showing an increase in differential pressure with respect to an increase in coolant flow rate in the conventional demineralizer, from which it can be seen that a large differential pressure is formed when the flow rate of coolant is increased.

It is known that when the coolant passes through an ion resin layer in the longitudinal direction, a region of the ion resin layer, in which the coolant introduced through the inlet port is filtered, i.e., the width of the ion resin layer, which actually removes ions, on the coolant flow path in the longitudinal direction, is about 15 to 30 mm.

The ion resin in the downstream beyond the width of the ion resin layer, which actually removes ions, shows a low filtering effect, and thus it is not necessary to increase the length of the ion resin layer as much as the longitudinal length of the housing. The ion resin in the downstream other than the region which contributes to the actual filtering is unnecessary.

Accordingly, in the case of the demineralizer configured such that the coolant is suitably introduced through one end of the housing, passes through the ion resin layer in the longitudinal direction, and reaches the other end of the housing, an excessive amount of the ion resin is used, which increases the manufacturing cost and significantly increases the differential pressure.

Further, while the ion resin layer in the vicinity of the outlet port, through which the coolant is suitably discharged, is not used for the filtering of ions, the ion resin layer in the vicinity of the inlet port, through which the coolant is suitably introduced, is mainly used for the filtering of ions.

Therefore, when the demineralizer should be replaced with new one due to a long-term use of the ion resin in the vicinity of the inlet port, it is necessary to replace the entire demineralizer with new one, although the ion resin in the vicinity of the outlet port is still usable, which increases the maintenance costs.

Further, as shown in FIG. 1, the conventional demineralizer is suitably mounted in a bypass loop, not in a main coolant loop, and a high differential pressure is formed due to the long length of the differential pressure region in the ion resin layer. As a result, it is very difficult to effectively circulate the coolant.

In particular, the problem that the coolant does not flow smoothly considerably reduces the effect of filtering ions, and as a result the electrical conductivity is not considerably reduced during initial start-up of the vehicle. As a result, it is difficult to prevent current leakage.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a demineralizer for a fuel cell vehicle configured to prevent the occurrence of differential pressure due to an ion resin layer such that coolant smoothly flows through the demineralizer, thereby increasing the effect of filtering ions. In preferred embodiments, the present invention addresses the problems of the generation of electrical conductivity, the current leakage from a fuel cell stack, and the electrical safety.

In a preferred embodiment, the present invention provides a coolant demineralizer for a fuel cell vehicle, the coolant demineralizer preferably including a housing having an inlet port and an outlet port; and a hollow filter member, in which an ion resin is filled, having a first flow chamber suitably mounted in the housing and connected to the inlet port of the housing, wherein a second flow chamber may be suitably formed on the outside of the filter member in the housing and suitably connected to the outlet port such that coolant introduced into the first flow chamber through the inlet port passes through the filter member in a radial direction to be filtered and is then suitably discharged through the second flow chamber and the outlet port, and wherein the filter member may preferably include a plurality of coolant through holes formed on an inner surface of the filter member, through which the coolant in the first flow chamber is suitably introduced into the ion resin, each of the coolant through holes having a different size at each position in the longitudinal direction of the first flow chamber such that the flow of coolant is uniformly distributed over the entire region of the filter member.

In another preferred embodiment, the coolant through hole, which is preferably located adjacent to the inlet port, may have a suitably large size to increase an area through which the coolant passes, and the coolant through hole, which is preferably located far away from the inlet port, may have a suitably small size to reduce the area through which the coolant passes.

In another preferred embodiment, the filter member may preferably include a filter frame including an inside frame and an outside frame, in which the coolant through holes are suitably formed, which are connected by an end portion at one end thereof to form a dual pipe structure, the inside frame, the outside frame, and the end portion forming a resin filling chamber in which the ion resin is filled; a mesh net suitably provided on an inner surface of each of the inside frame and the outside frame to prevent the ion resin from leaking to the outside through the coolant through holes; the ion resin filled in the resin filling chamber between the inside frame and the outside frame to remove ions from the coolant; and a filter cap suitably fixed to the other end of the inside frame and the outside frame and sealing the resin filling chamber and the first flow chamber of the inside frame.

In still another preferred embodiment, the coolant through hole formed in the inside frame, which is preferably located adjacent to the inlet port, may have a relatively large size, and the coolant through hole formed in the inside frame, which is preferably located far away from the inlet port, may have a relatively small size.

In yet another preferred embodiment, the coolant demineralizer of the present invention may further include a vortex generating member suitably provided inside the first flow chamber to rotate the flow of coolant, introduced through the inlet port of the housing and moving along the inside of the first flow chamber.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 13 is a longitudinal cross-sectional view of an inside frame of a filter member in the demineralizer in accordance with another exemplary embodiment of the present invention.

Figure 1:
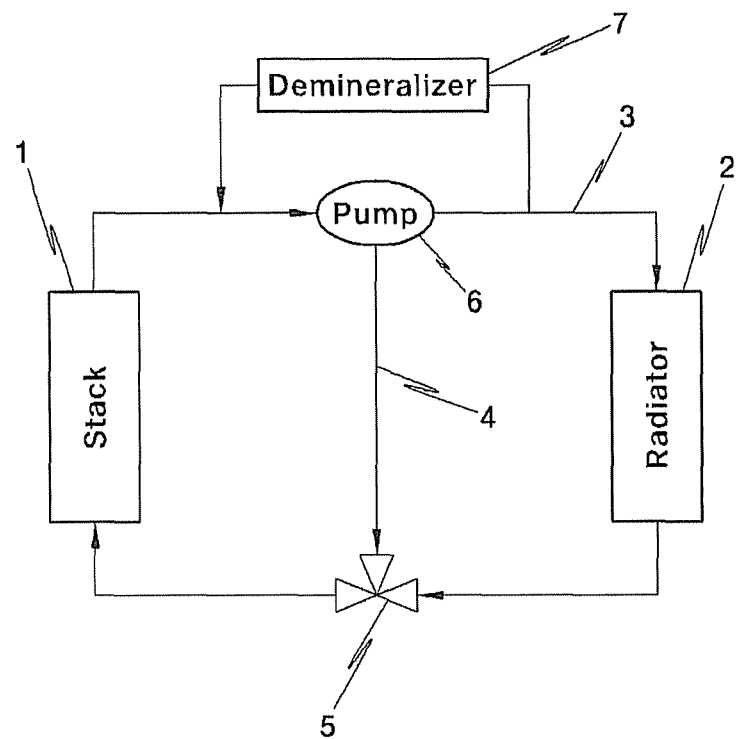
FIG. 1 is a schematic diagram of a coolant loop of the fuel cell vehicle.
Figure 2:
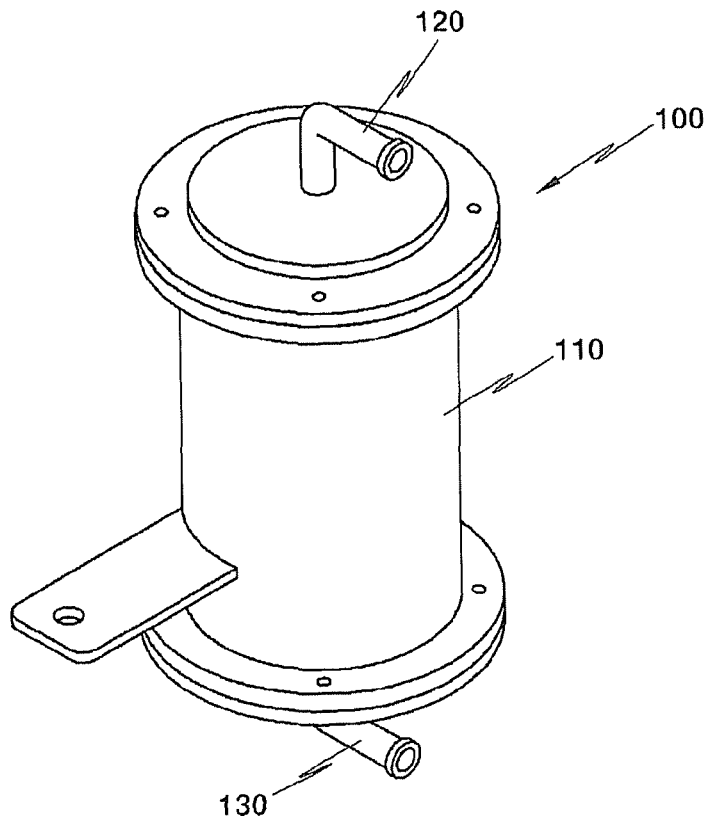
FIG. 2 is a perspective view of a conventional coolant demineralizer.
Figure 3:
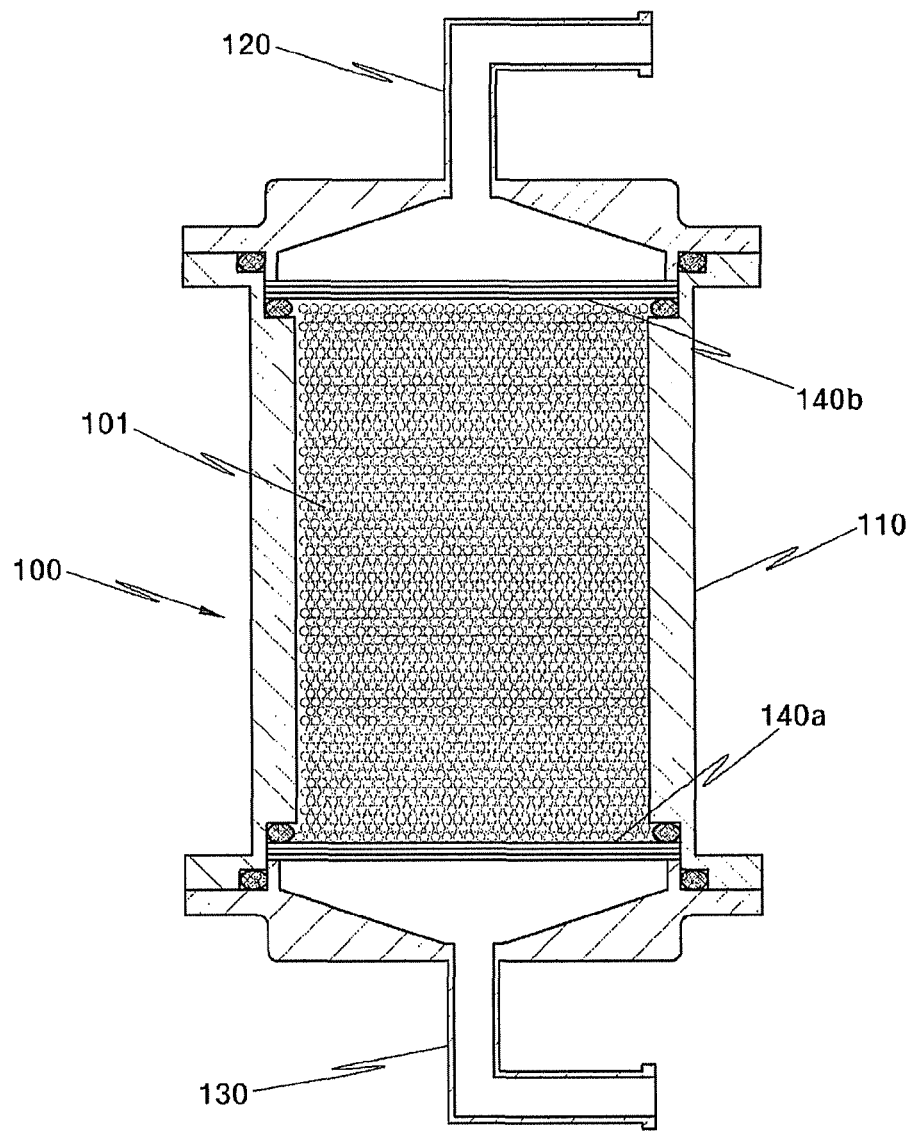
FIG. 3 is a longitudinal cross-sectional view of the conventional coolant demineralizer of FIG. 2.
Figure 4:
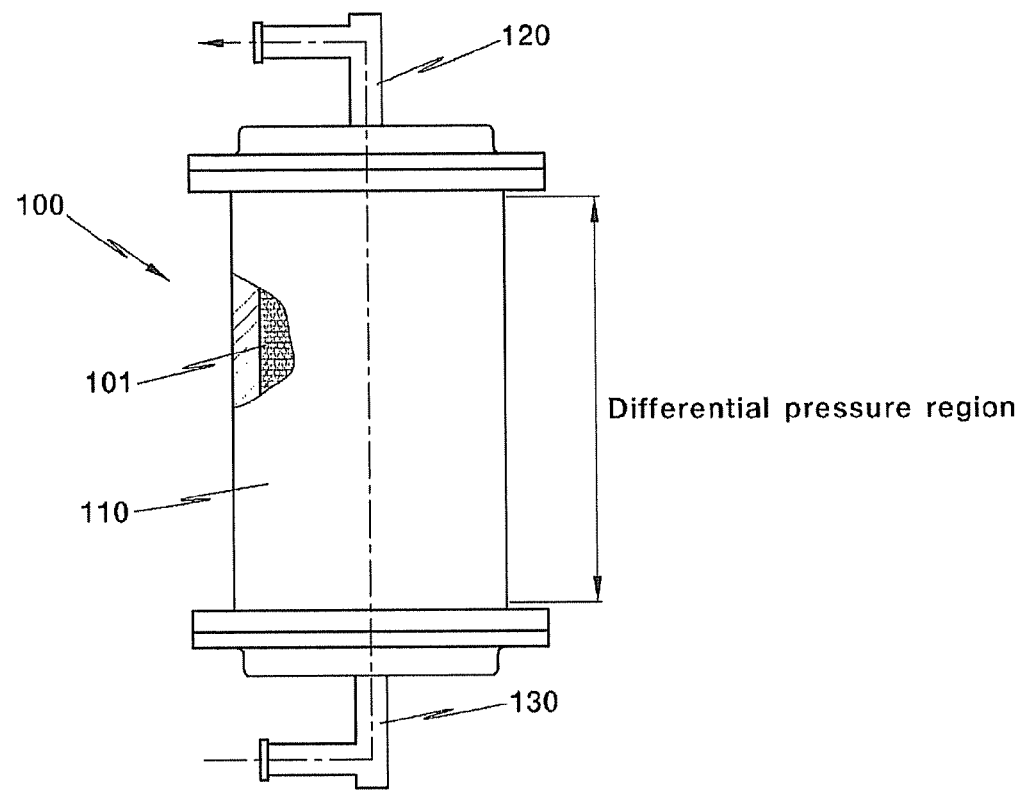
FIG. 4 is a diagram showing a differential pressure region in the conventional coolant demineralizer.
Figure 5:
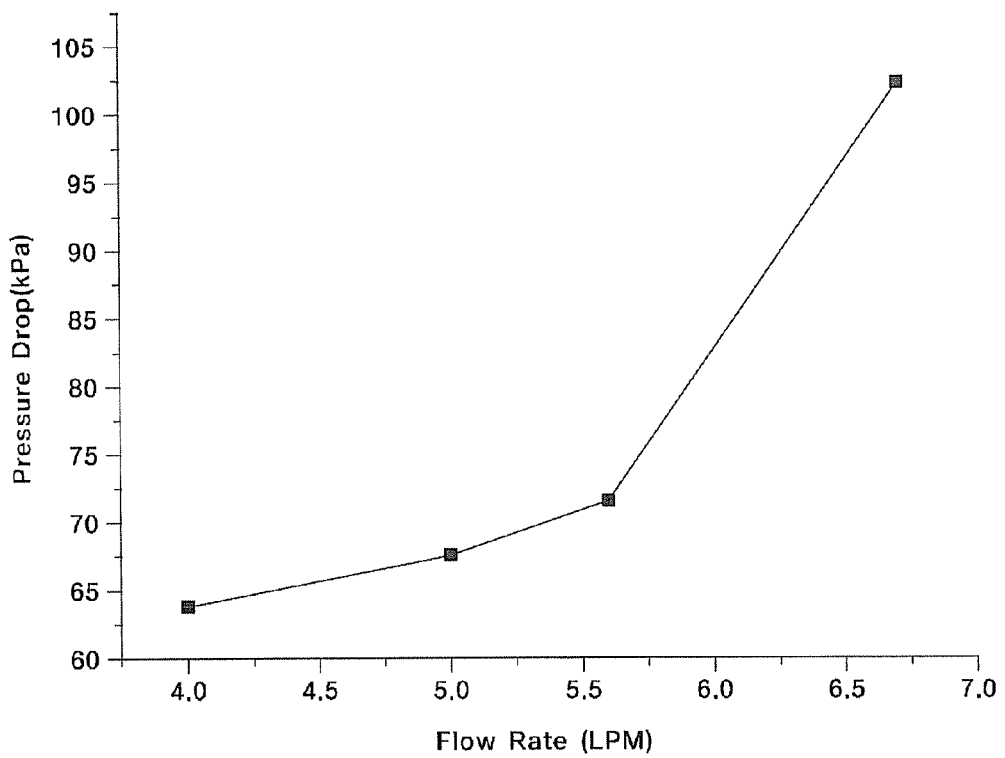
FIG. 5 is a graph showing an increase in differential pressure with respect to an increase in coolant flow rate in the conventional demineralizer.

Reference numerals set forth in the Drawings includes reference to the following elements as further discussed below:

| 100: demineralizer | 102: first flow chamber |
| 103: second flow chamber | 110: housing |
| 120: inlet port | 130: outlet port |
| 140: filter member | 150: screw |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

In one preferred aspect, the present invention features a coolant demineralizer for a fuel cell vehicle, the coolant demineralizer comprising a housing including an inlet port and an outlet port, a hollow filter member, in which an ion resin is filled, and a second flow chamber on the outside of the filter member.

In one embodiment, the hollow filter member comprises a first flow chamber mounted in the housing and connected to the inlet port of the housing.

In another embodiment, the second flow chamber is formed on the outside of the filter member in the housing and is connected to the outlet port such that coolant introduced into the first flow chamber through the inlet port passes through the filter member in a radial direction to be filtered and is then discharged through the second flow chamber and the outlet port.

In another further embodiment, the filter member comprises a plurality of coolant through holes formed on an inner surface of the filter member, through which the coolant in the first flow chamber is introduced into the ion resin, each of the coolant through holes having a different size in each position in the longitudinal direction of the first flow chamber such that the flow of coolant is uniformly distributed over the entire region of the filter member.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 6:
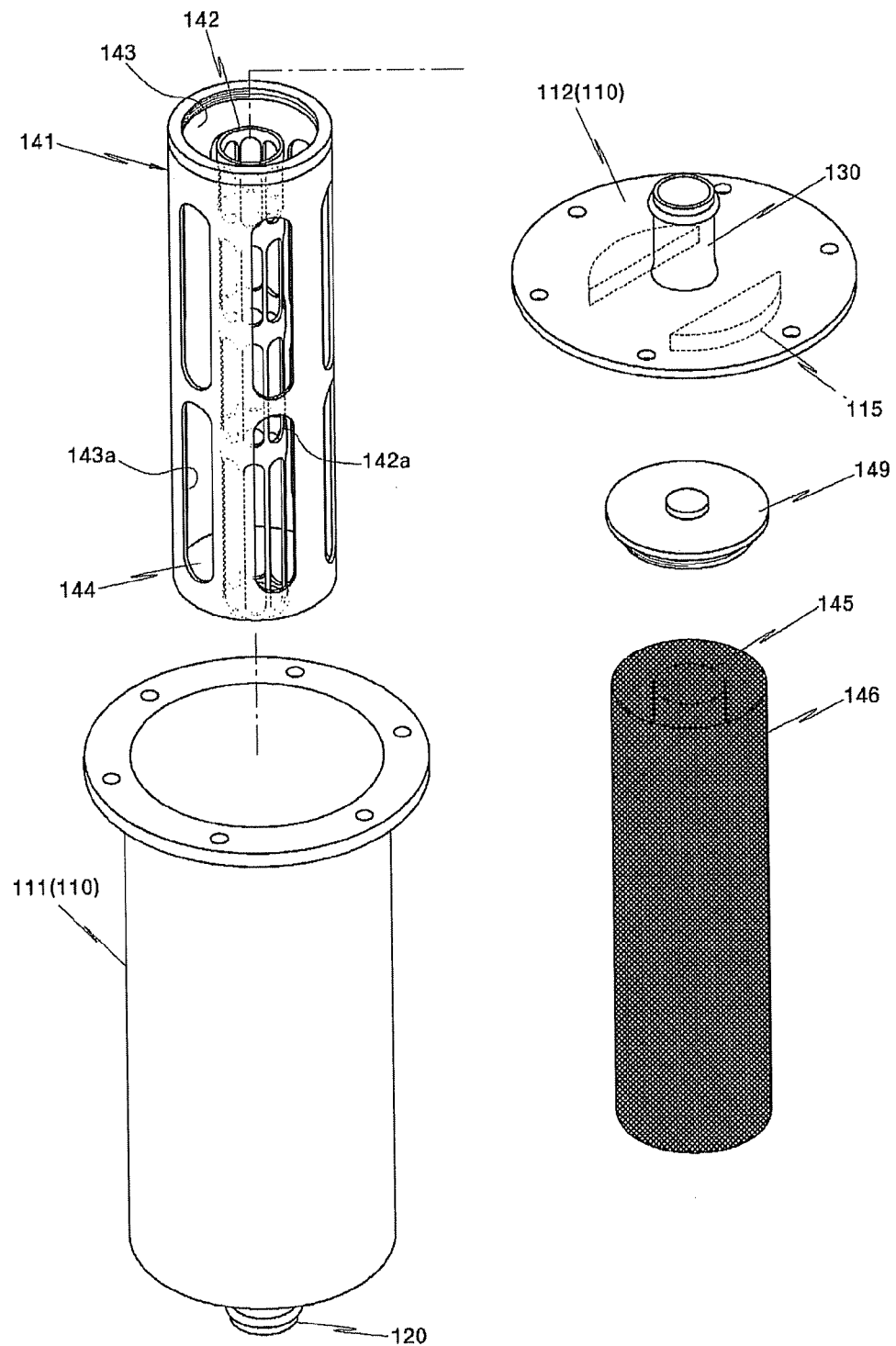
FIG. 6 is an exploded perspective view of a demineralizer in accordance with an exemplary embodiment of the present invention.
Figure 7:
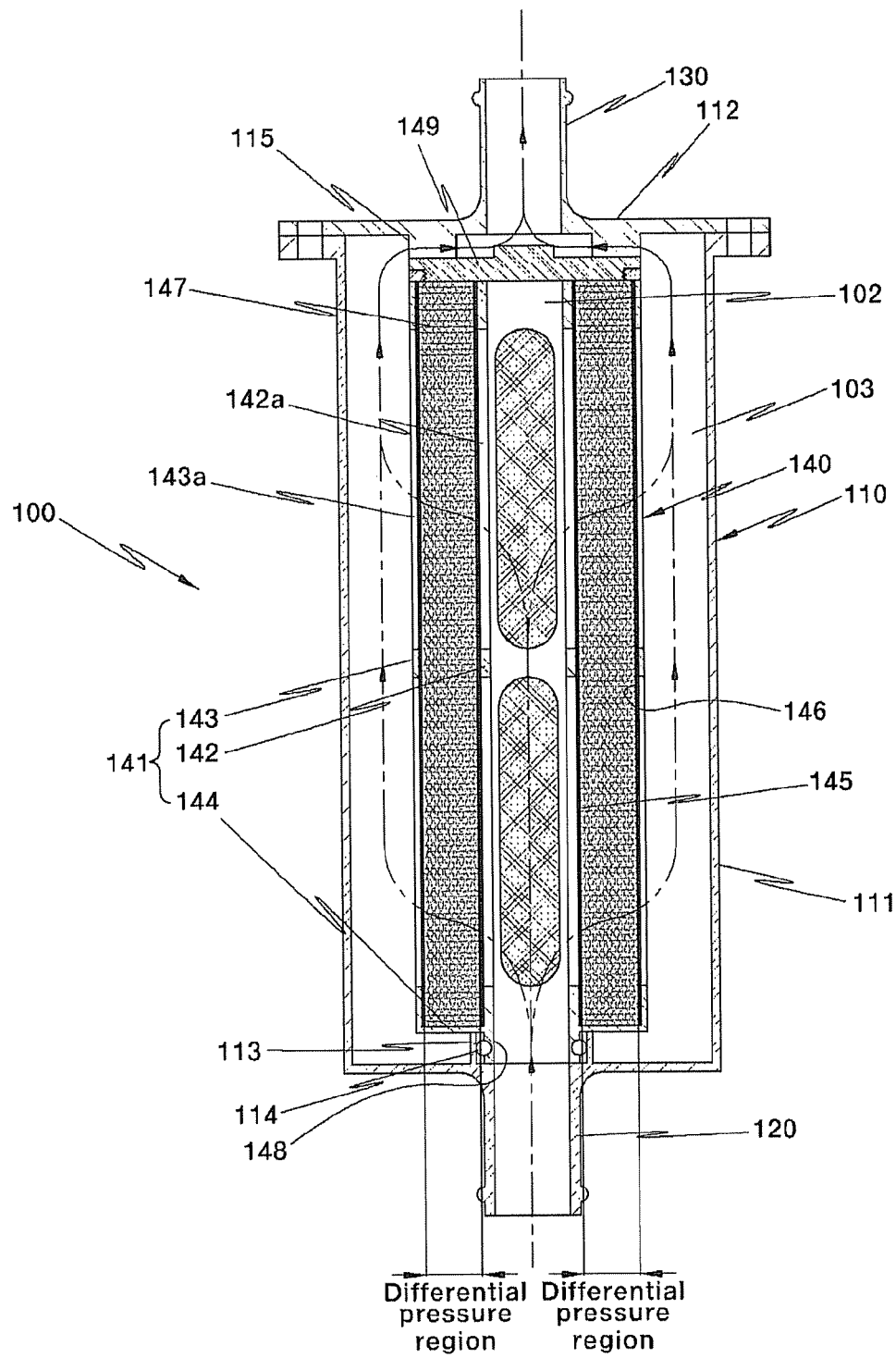
FIG. 7 is a longitudinal cross-sectional view of the conventional coolant demineralizer of FIG. 6.
Figure 8:
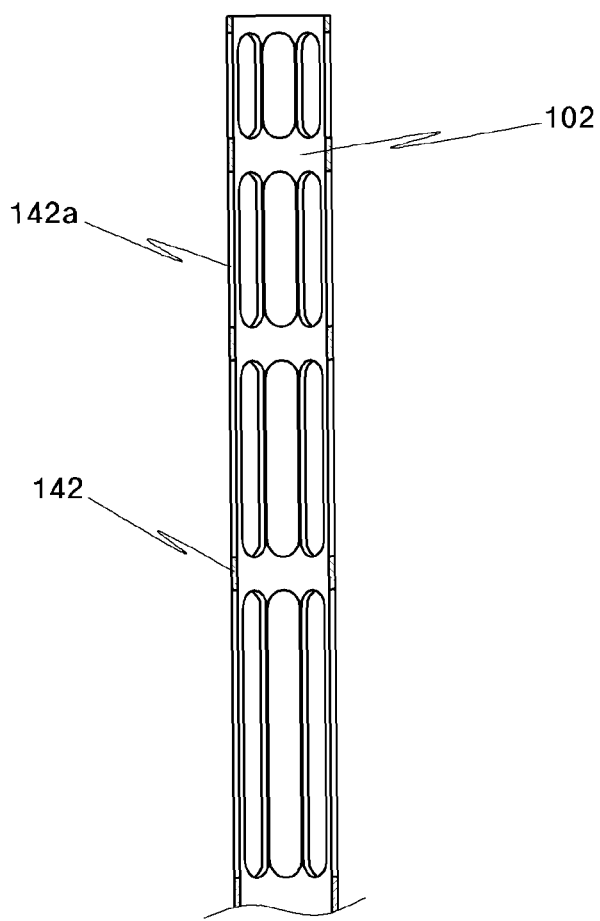
FIG. 8 is a longitudinal cross-sectional view showing an inside frame of a filter member in the demineralizer in accordance with an exemplary embodiment of the present invention.

According to preferred exemplary embodiments and as shown in FIG. 6, for example, FIG. 6 is an exploded perspective view of a demineralizer, in which an ion resin is not shown, FIG. 7 is an exemplary longitudinal cross-sectional view of the conventional coolant demineralizer of FIG. 6, and FIG. 8 is an exemplary longitudinal cross-sectional view showing an inside frame of a filter member in the demineralizer in accordance with an exemplary embodiment of the present invention.

Figure 9:
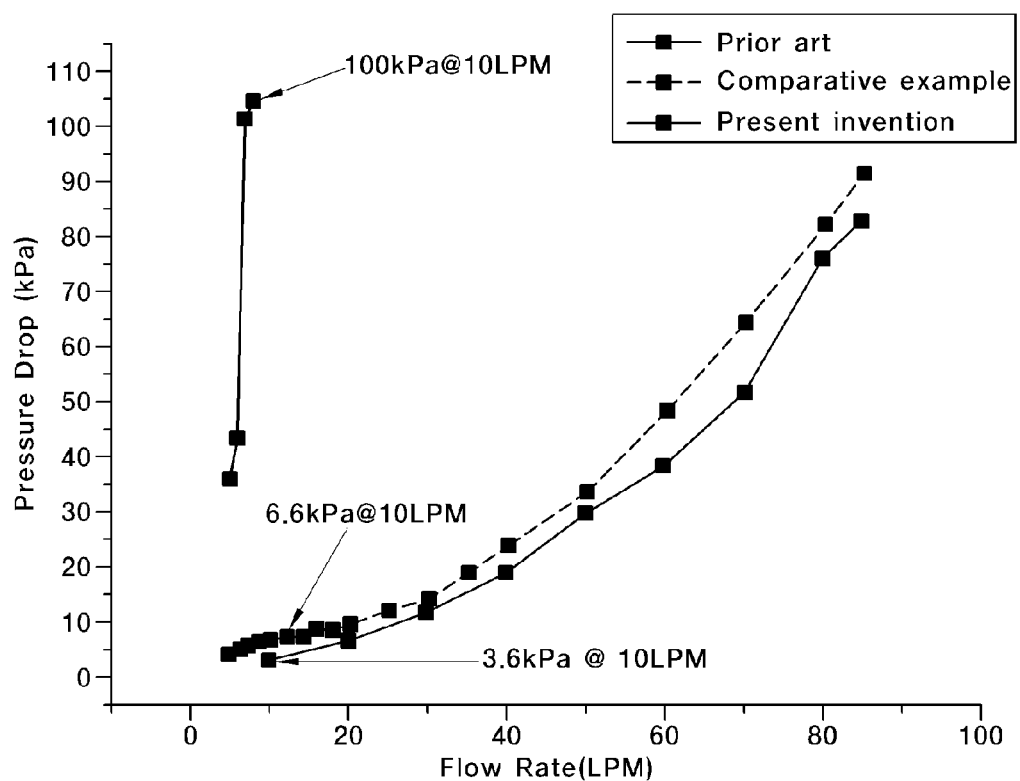
FIG. 9 is a graph comparing the differential pressures of the demineralizer in accordance with an exemplary embodiment of the present invention with those of the conventional demineralizer.
Figure 10:
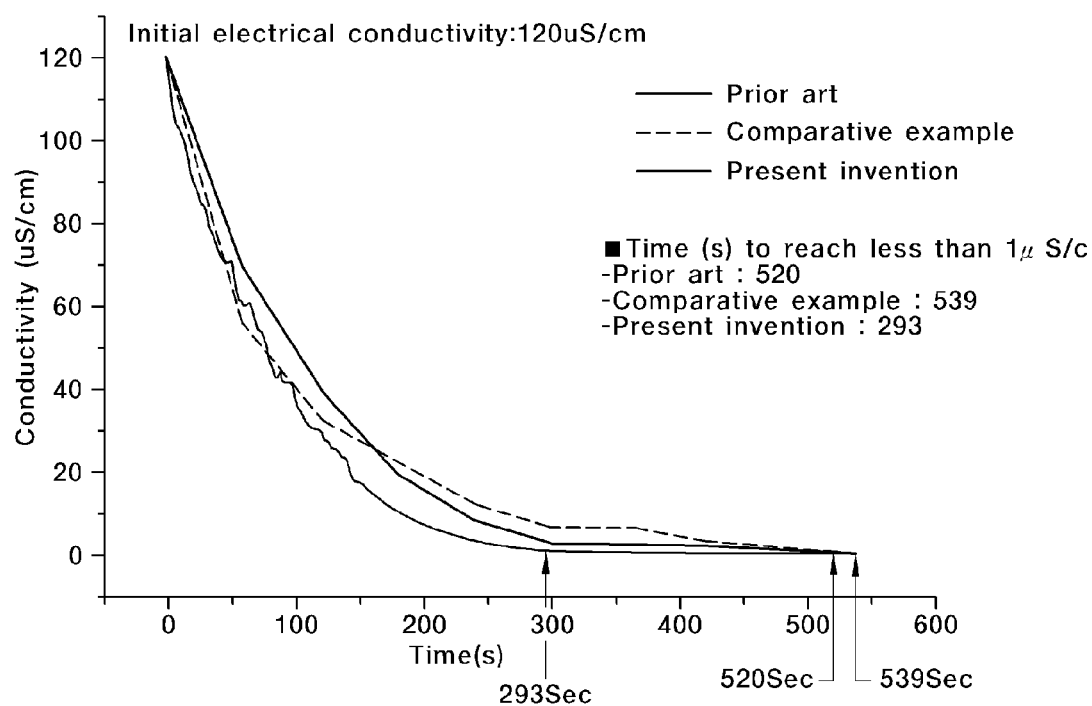
FIG. 10 is a graph showing a reduction in electrical conductivity in the demineralizer in accordance with an exemplary embodiment of the present invention.

According to preferred exemplary embodiments and as shown in FIG. 6, for example, FIG. 9 is a graph comparing the differential pressure of the demineralizer in accordance with an exemplary embodiment of the present invention with that of the conventional demineralizer. FIG. 10 is a graph showing a reduction in electrical conductivity in the demineralizers in accordance with another further exemplary embodiment of the present invention.

According to further preferred embodiments, the present invention provides a demineralizer for a fuel cell vehicle, which removes ions from coolant of a fuel cell stack. In particular preferred embodiments, the present invention provides a demineralizer in which a hollow filter member in which an ion resin is filled is employed to prevent the occurrence of differential pressure such that the coolant passes through the filter member in a radial direction, thereby reducing the thickness of an ion resin layer through which the coolant passes.

In a preferred exemplary embodiments, the demineralizer 100 in accordance with the present invention comprises a housing 110 including an inlet port 120 through which the coolant is suitably introduced and an outlet port 130 through which the coolant is suitably discharged and a hollow filter member 140 for removing ions, in which an ion resin 147 is filled, including a first flow chamber 102 suitably mounted in the housing 110 and connected to the inlet port 120 of the housing 110.

Preferably, here, a second flow chamber 103 suitably connected to the outlet port 130 of the housing 110 is provided on the outside of the filter member 140 in the housing 110 such that the coolant introduced into the first flow chamber 102 through the inlet port 120 passes through the filter member 140 in a radial direction to be filtered and is then discharged through the second flow chamber 103 and the outlet port 130.

In a preferred embodiment, the housing 110 suitably defines an inner space in which the filter member 140 is placed such that the coolant passes through the filter member 140. According to further preferred embodiments, the housing 110 may preferably comprise a housing main body 111 and a housing cap 112. Preferably, the housing cap 112 may be detachably connected to the housing main body 111 to facilitate the replacement of the filter member 140.

Preferably, the inlet port 120 through which the coolant is introduced is integrally formed on one end of the housing main body 111, and the outlet port 130 is integrally formed with the housing cap 112 suitably connected to the other end of the housing main body 111.

Preferably, the inlet port 120 is suitably formed in the center of one end of the housing main body 111 and is suitably connected to the first flow chamber 102 provided in the hollow filter member 140.

In other further preferred embodiments, the second flow chamber 103, through which the coolant passing through the filter member 140 (the coolant from which ions are removed by the ion resin) flows, is provided between the inside of the housing main body 111 and the outside of the filter member 140. Preferably, the second flow chamber 103 is suitably connected to the outlet port 130 of the housing cap 112.

According to further preferred embodiments, the housing cap 112 serves to seal the inner space of the housing main body 111. Preferably, the housing cap 112 has a suitably flange shape including the outlet port 130 formed in the center thereof and is fixed to a flange formed on the end of the housing main body 111 by fastening means such as screws.

Meanwhile, according to further preferred embodiments of the present invention, the filter member 140 generally has a cylindrical shape with a hollow portion (i.e., the first flow chamber) into which the coolant is suitably introduced through the inlet port 120. Preferably, the filter member 140 includes a filter frame 141, mesh nets 145 and 146, the ion resin 147, and a filter cap 149.

In other further preferred embodiments, the filter frame 141 includes an inside frame 142 and an outside frame 143, in which the coolant through holes 142a and 143a are formed. Preferably, the inside frame 142 and the outside frame 143 are suitably spaced from each other and fixed by an end portion 144 at one end thereof, thus forming a dual pipe structure. Preferably, the inside frame 142, the outside frame 143, and the end portion 144 form a resin filling chamber in which the ion resin 147 is filled.

Accordingly, in further preferred exemplary embodiments, the filter frame 114 has the dual pipe structure in which the inside frame 142 and the outside frame 143 are suitably spaced from each other in the same axis, and the space formed between the inside frame 142 and the outside frame 143 preferably serves as the resin filling chamber in which the ion resin 147 is suitably filled.

According to further preferred embodiments, a plurality of coolant through holes 142a and 143a formed in the longitudinal direction are suitably provided on the inside frame 142 and the outside frame 143 in the circumferential direction thereof at a constant interval.

Preferably, with the coolant through holes 142a and 143a suitably provided on the inside frame 142 and the outside frame 143, the demineralizer 100 of the present invention has the following characteristics.

First, the coolant through holes 143a of the outside frame 143 are suitably formed in the longitudinal direction thereof and, as shown in the figures, each pair of coolant through holes 143a suitably formed in the longitudinal direction of the outside frame 143 is disposed on the circumference of the outside frame in a straight line at a constant interval.

Preferably, in the demineralizer 100 of the present invention suitably configured such that the coolant introduced into the first flow chamber 102 through the inlet port 120 passes through the filter member 140 in a radial direction, the coolant through holes 142a of the inside frame 142 serve as holes through which the coolant introduced into the first flow chamber 102 is fed into the ion resin layer inside the filter member 140 and serve as holes through which the flow of the coolant passing through the filter member 140 in the first flow chamber 102 in a radial direction is suitably distributed.

Accordingly, the coolant through holes 142a of the inside frame 142 should suitably have a structure in which the coolant introduced into the first flow chamber 102 is uniformly distributed over the entire region of the filter member 140 in the longitudinal direction and passes through the filter member 140. Accordingly, in further preferred exemplary embodiments, the coolant through holes 142a of the inside frame 142 should have a structure in which the flow of the coolant is uniformly distributed over the entire region of the first flow chamber 102 in the longitudinal direction and passes therethrough.

Preferably, according to still further preferred embodiments of the present invention, an improvement in the flow distribution in the first flow chamber 102 is to uniformly distribute the flow of the coolant passing through the ion resin layer over the entire ion resin layer, which suitably prevents the occurrence of a pressure drop, i.e., a differential pressure and, at the same time, preferably allows the entire ion resin to be uniformly used.

Preferably, if the flow of the coolant introduced into the ion resin layer through the coolant through holes 142a of the inside frame 142 is not uniformly distributed over the entire region of the first flow chamber 102 in the longitudinal direction, the differential pressure is suitably increased, the effect of filtering ions is reduced (the ion resin is not uniformly used and only one side of the ion resin is mainly used), and the replacement period is suitably reduced.

Accordingly, to uniformly distribute the flow of the coolant passing through the filter member 140 in a radial direction, it is necessary that the coolant through holes 142a of the inside frame 142, which suitably correspond to the inside of the filter member 140 through which the coolant in the first flow chamber 102 is introduced into the ion resin, have different sizes along the flow direction of the coolant in the first flow chamber 102.

Accordingly, for example as shown in FIG. 8, in further exemplary embodiments, the coolant through hole 142a of the inside frame 142, which is preferably located adjacent to the inlet port 120, has a larger size, to suitably increase the area through which the coolant passes. Preferably, the coolant through hole 142a, which is located far away from the inlet port 120 (i.e., adjacent to a closed area on the opposite side), has a smaller size, to suitably reduce the area through which the coolant passes.

According to further preferred embodiments of the present invention, if the coolant through holes 142a of the inside frame 142 have the same size along the flow direction of the coolant (in the longitudinal direction of the inside frame 142), like the coolant through holes 143a of the outside frame 143, when the coolant introduced into the first flow chamber 102 through the inlet port 120 flows in the longitudinal direction of the first flow chamber 102, the flow rate of the coolant is suitably increased by the inertia when it is closer to the closed area, and thereby the flow of the coolant is not suitably uniformly distributed over the entire region in the longitudinal direction of the first flow chamber 102.

Accordingly, in further preferred embodiments of the present invention, in order to uniformly distribute the flow of the coolant over the entire region of the first flow chamber 102, the demineralizer 100 of the present invention preferably has a structure in which the coolant through hole 142a of the inside frame 142, which is suitably located adjacent to an inlet side of the first flow chamber (through which the coolant is introduced), has a larger size, to suitably increase the area through which the coolant passes, and the coolant through hole 142a, which is located far away from the inlet side (i.e., adjacent to the closed area), has a smaller size, to reduce the area through which the coolant passes.

In another preferred embodiment, if the coolant through holes 142a of the inside frame 142 having the same width are suitably formed in the longitudinal direction of the inside frame 142 and suitably disposed on the circumference of the inside frame 142 in a straight line at a constant interval, the length of the coolant through hole 142a, which is preferably located adjacent to the inlet side, may be suitably increased, and the length of the coolant through hole 142a, which is located far away from the inlet side, may be reduced so as to be different from each other in the longitudinal direction of the inside frame 142.

Accordingly, in further preferred embodiments, in this case, when the coolant flows in the longitudinal direction of the first flow chamber 102 by the inertia, the coolant can uniformly pass through the filter member 140 and the ion resin layer inside thereof over the entire region in the longitudinal direction of the filter member 140.

In further preferred embodiments, the end portion 144 integrally connects the inside frame 142 and the outside frame 143 to form the resin filling chamber, and the center of the end portion 144 is opened to serve as an inlet through which the coolant is suitably introduced into the hollow inside of the inside frame 142, i.e., the first flow chamber 102.

In another further preferred embodiment, an inlet port 148 connected to the first flow chamber 102 is suitably formed to project from the center of the end portion. Preferably, the inlet port 148 of the filter frame 141 is suitably inserted and connected to a cylindrical port insertion 113 projecting from the inside of the housing main body 111 and connected to the inlet port 120.

Accordingly, as a result, the inlet port 148 of the filter frame 141 is suitably inserted and connected to the port insertion 113 of the housing 110 such that the inlet port 120 is suitably connected to the first flow chamber 102 of the filter frame 141 in a straight line, and thereby the coolant introduced through the inlet port 120 can pass through the first flow chamber 102 and the filter member 140 in a radial direction.

According to other further preferred embodiments, an O-ring 114 is suitably disposed between the port insertion 113 and the inlet port 148 such that the coolant does not leak to the second flow chamber 103.

Preferably, the mesh nets 145 and 146 are provided on the inside of the inside frame 142 and the outside frame 143, respectively, to suitably maintain the filled state of the ion resin 147 and to prevent the ion resin 147 from leaking to the outside through the coolant through holes 142a and 143a.

Accordingly, the mesh nets 145 and 146 preferably prevent the ion resin 147 from leaking to the outside through the coolant through holes 142a and 143a of the inside frame 142 and the outside frame 143. Preferably, the mesh nets 145 and 146 serve to pass the coolant and entrap the ion resin 147 in the form of small grains in the resin filling chamber.

According to other further preferred embodiments, the ion resin 147 is filled in the resin filling chamber between the inside frame 142 and the outside frame 143 to suitably remove ions from the coolant. Preferably, the filter cap 149 is suitably fixed to the other end of the inside frame 142 and the outside frame 143 to seal the resin filling chamber and the hollow portion of the inside frame 142, i.e., one end of the first flow chamber 102.

In another preferred embodiment, the filter cap 149 may be detachably connected to the filter frame 141 to suitably facilitate the replacement of the ion resin 147. That is, the filter cap 149 may be connected to the filter frame 141 by screws, for example.

Preferably, here, a screw thread may be suitably formed on the inner circumferential surface of an end of the outside frame 143 and the outer circumferential surface of the filter cap 149 inserted thereinto such that the filter cap 149 is screw-connected to the outside frame 143 and fixed thereto.

According to further preferred embodiments, a screw thread may be formed on the outer circumferential surface of an end of the outside frame 143 and the inner circumferential surface of the filter cap 149 being in contact therewith such that the filter cap 149 is screw-connected to the outer circumferential surface of the outside frame 143.

In other further preferred embodiments, in the demineralizer 100 in accordance with the present invention, the coolant preferably introduced into the first flow chamber 102 through the inlet port 120 passes through the filter member 140 in a radial direction to move to the second flow chamber 103. Preferably, the coolant from which ions are removed in the second flow chamber 103 flows along the inner wall of the housing main body 111 and is then suitably discharged through the outlet port 130 formed on the housing cap 112.

According to other further preferred embodiments, the second flow chamber 103 should be suitably connected to the outlet port 130 such that the coolant passes through the filter member 140 in a radial direction and is then discharged through the outlet port 130. Accordingly, a plurality of projections 115 for supporting the filter member 140 are suitably formed on the inner surface of the housing cap 112, and the projections 115 are spaced from each other to pass the coolant therethrough.

Accordingly, in further exemplary embodiments, the projections are suitably spaced from each other to form a coolant path suitably connected to the outlet port 130 such that the coolant in the second flow chamber 103 passes through the coolant path between the projections 115 and is then discharged through the outlet port 130.

According to the demineralizer 100 of the present invention, in which the hollow filter member 140 filled with the ion resin 147 is suitably employed, the coolant is introduced into the first flow chamber 102 in the hollow portion and then passes through the filter member 140 in a radial direction. Accordingly, the thickness of the filter member 140, through which the coolant passes, i.e., the thickness of the ion resin layer (in the differential pressure region) can be suitably reduced to the extent that it does not affect the filtering performance, and the use of unnecessary ion resin, which does not contribute to the filtering, can be reduced.

Accordingly, in preferred embodiments of the present invention, since the thickness of the ion resin layer, which corresponds to the differential pressure region, can be considerably reduced compared to the conventional demineralizer, it is possible to considerably reduce the occurrence of different pressure in the coolant. For example, as shown in FIG. 9, it can be seen that the occurrence of differential pressure can be considerably reduced when head of a coolant pump is low, that is, when the flow rate of coolant is suitably low compared to the conventional demineralizer.

Furthermore, it can be seen that since the occurrence of differential pressure (pressure drop) is significantly reduced, the flow rate in the case of the present invention is significantly increased with respect to the same differential pressure.

Preferably, in the case where the filter member 140 has a hollow structure to considerably reduce the differential pressure, the coolant can smoothly flow in the demineralizer, which increases the filtering effect and rapidly reduces the electrical conductivity of the coolant. Accordingly, as a result, it is possible to solve the problem that the electrical conductivity is slowly reduced during initial start-up.

Further, while the thickness of the ion resin layer is suitably reduced, the area of the ion resin layer (i.e., the inner circumferential area of the first flow chamber) through which the coolant can pass is considerably increased, which considerably increases the effect of filtering ions.

Conventionally, since the rotational speed of the coolant pump is suitably reduced during the initial start-up, the head of the pump is low, and thereby the coolant does not flow into the demineralizer. However, according to preferred embodiments of the present invention, it is possible to considerably reduce the occurrence of differential pressure even when the flow rate of coolant is low, and thus it is possible to ensure the electrical safety during the initial start-up.

According to exemplary embodiments of the present invention and as shown, for example in the comparative example of FIG. 9, a pressure drop in a demineralizer in which the coolant through holes 142a of the inside frame 142 have the same size is shown. For example, it can be seen from FIG. 9 that the occurrence of differential pressure can be considerably reduced in the demineralizer of the present invention in which the coolant through holes 142a have different sizes along the longitudinal direction of the inside frame 142.

According to further exemplary embodiments, FIG. 10 shows a reduction in electrical conductivity in the demineralizer in accordance with the present invention, as compared to the demineralizers according to the prior art and the comparative example, in which the amount of time that the initial electrical conductivity is reduced from 120 μS/cm to less than 1 μS/cm under the same conditions (the same ion resin, the same pump pressure, and the same number of facilities) is shown.

For example, as can be seen from FIG. 10, the occurrence of differential pressure is suitably reduced and the reduction in the electrical conductivity is improved in the demineralizer of the present invention and that the amount of time required to reach the electrical conductivity of less than 1 μS/cm is considerably reduced compared to the demineralizers according to the prior art and the comparative example.

Figure 11:
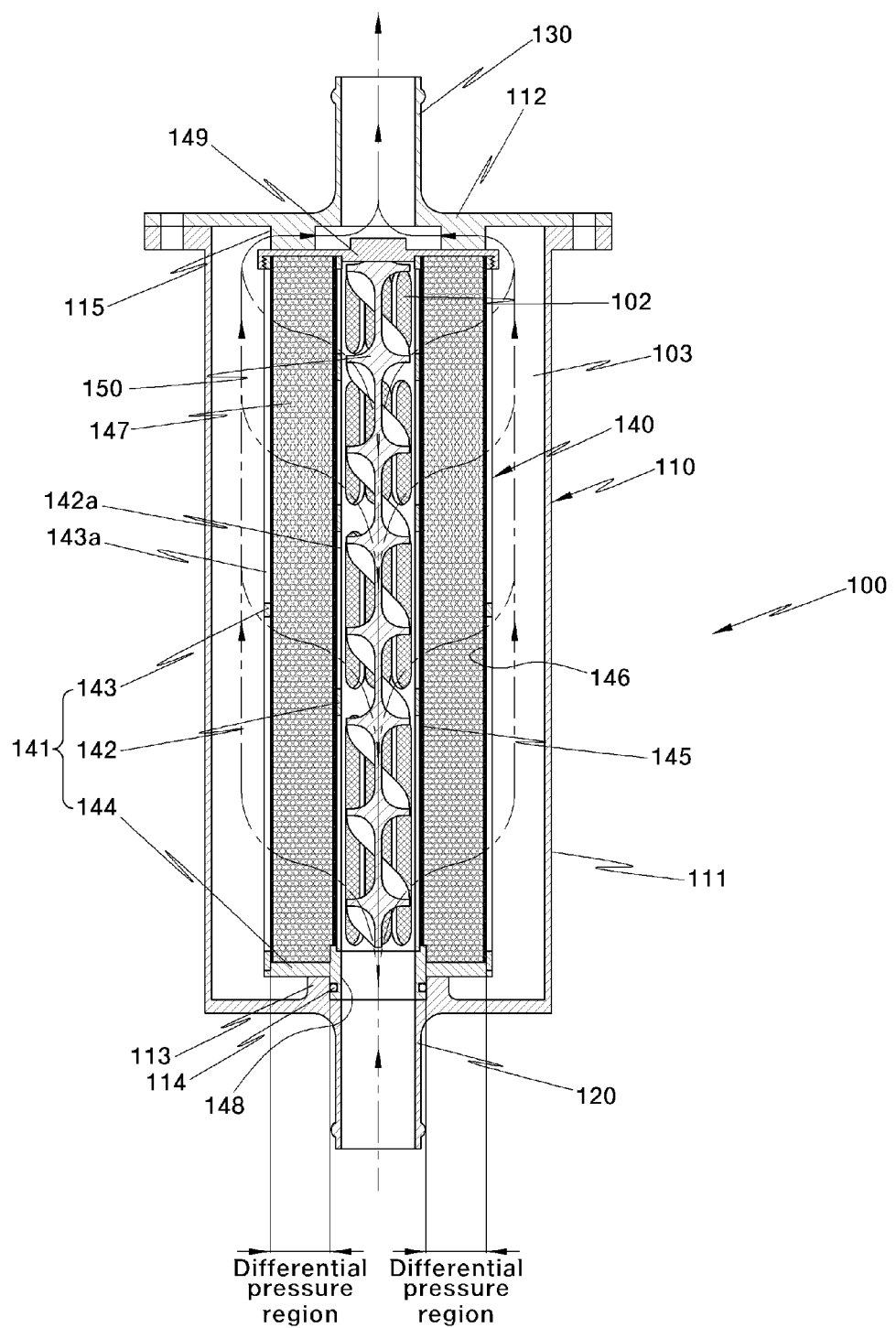
FIG. 11 is a longitudinal cross-sectional view of a demineralizer in accordance with another exemplary embodiment of the present invention.
Figure 12A:
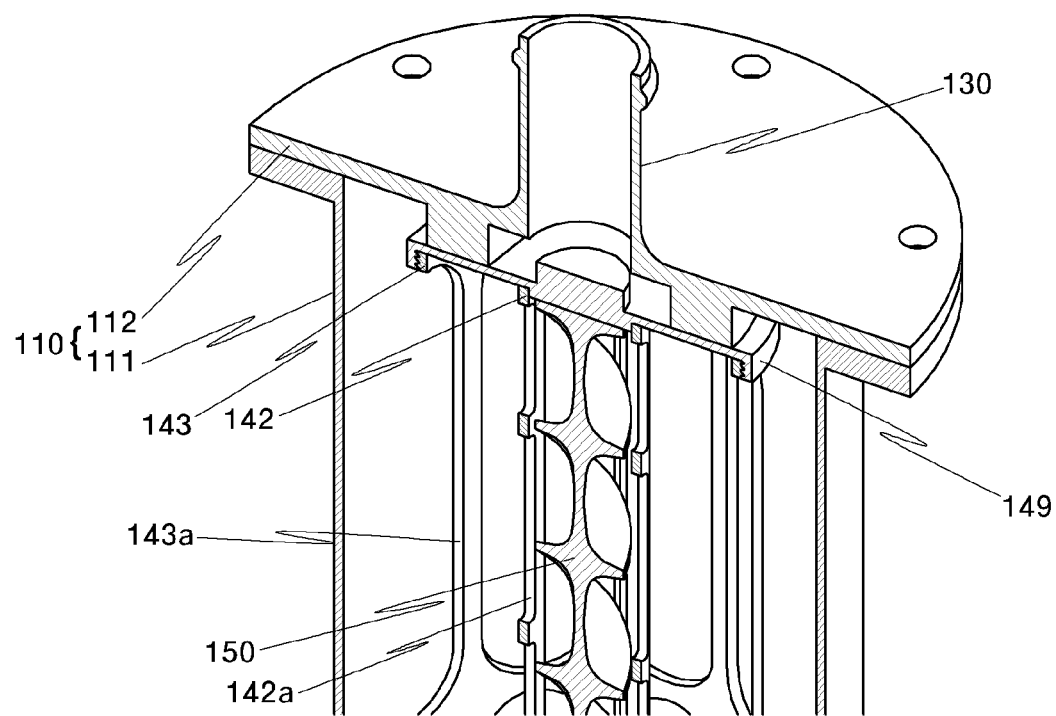
FIGS. 12A and 12B are perspective views showing main parts of the demineralizer in accordance with another exemplary embodiment of the present invention.
Figure 12B:
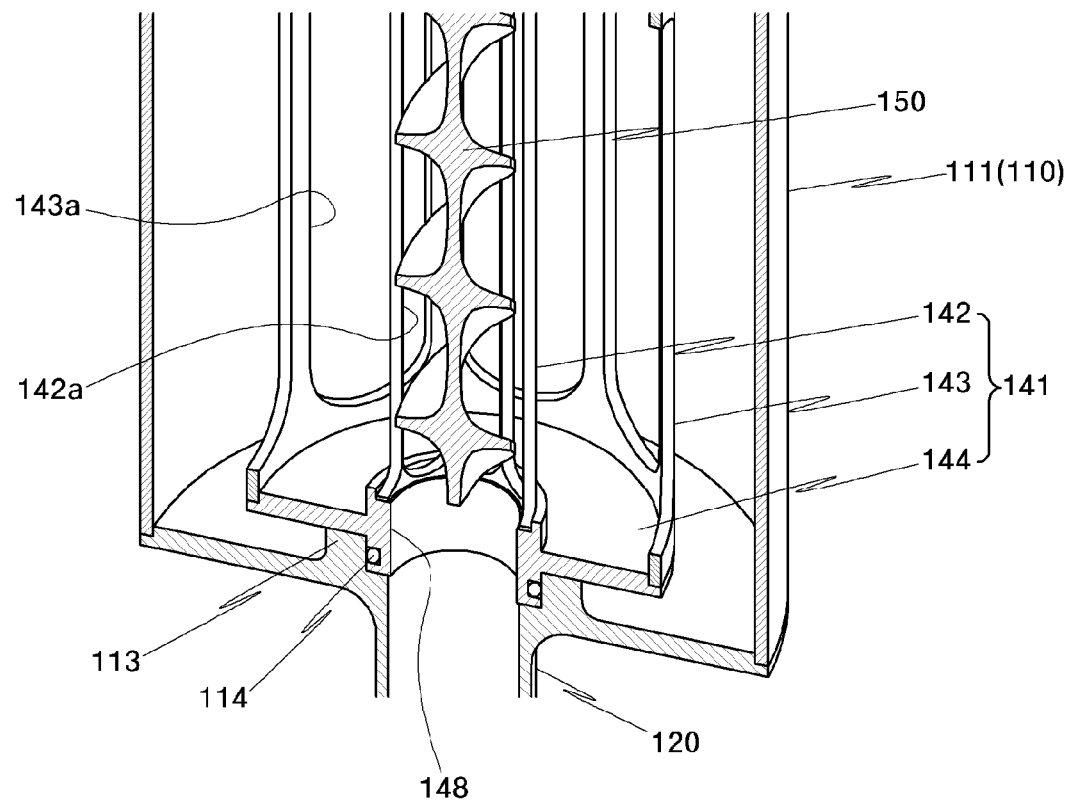

According to other further preferred embodiments of the present invention, FIG. 11 is a longitudinal cross-sectional view of a demineralizer. FIGS. 12A and 12B are perspective views showing main parts of the demineralizer in accordance with another exemplary embodiment of the present invention, and FIG. 13 is a longitudinal cross-sectional view of an inside frame of a filter member in the demineralizer in accordance with another exemplary embodiment of the present invention. According to another exemplary embodiment of the present invention, a vortex generating member which can rotate the flow of coolant is provided in a hollow portion of the filter member so as to improve the flow distribution with respect to each position of the filter member in such a structure that the coolant passes through the filter member in a radial direction.

Preferably, the vortex generating member allows the flow of coolant to be uniformly distributed over the entire region in the longitudinal direction of the filter member while the coolant flows in the hollow portion of the filter member in the longitudinal (axial) direction thereof and allows the flow rate of coolant in the filter member to be uniform over the entire region of the ion resin.

The filter member according to an exemplary embodiment has a configuration as that of FIG. 6, except that the vortex generating member is further included in the hollow portion of the filter member.

Preferably, first, the vortex generating member for rotating the flow of coolant is suitably provided inside the filter member 140, i.e., inside the first flow chamber 102 in which the coolant flows in the longitudinal (axial) direction.

In a preferred embodiment, the vortex generating member may be a screw 150 formed by rolling a long plate in a spiral shape to be arranged over the entire region in the longitudinal (axial) direction of the first flow chamber 102.

Preferably, one end of the screw 150 is inserted and fixed to the inner surface of the filter cap 149 and, in the case where the filter cap 149 is formed of a metal material such as SUS316L, the screw 150 may be welded to the filter cap 149.

Further, when the screw 150 is provided inside the first flow chamber 102 in the above manner, the coolant introduced through the inlet port 120 moves along the first flow chamber 102 and is guided along the surface of the screw 150 to be rotated in the first flow chamber 102.

Accordingly, as a result, while the coolant moves along the first flow chamber 102, the flow of the coolant is appropriately distributed over the entire region of the first flow chamber 102 in the longitudinal direction thereof, thus suitably improving the flow distribution with respect to each position of the first flow chamber 102.

According to further preferred embodiments of the present invention, since the vortex generating member is suitably provided in the demineralizer in accordance with another exemplary embodiment of the present invention, the flow rate of coolant is uniform over the entire region of the first flow chamber 102 in the longitudinal direction thereof, and the flow distribution is further suitably improved, which allows the coolant to uniformly flow over the entire ion resin.

As described herein, according to the coolant demineralizer of the present invention, the hollow filter member, in which the ion resin is filled, is suitably employed to reduce the occurrence of differential pressure such that the coolant passes through the filter member in a radial direction, and thereby it is possible to reduce the thickness of the ion resin layer through which the coolant passes, which allows the coolant to smoothly flow, thereby increasing the effect of filtering ions.

Accordingly, it is possible to solve the problem that the electrical conductivity is slowly reduced during initial start-up to cause the current leakage from the fuel cell stack.

In particular, according to preferred embodiments of the present invention, it is possible to considerably reduce the occurrence of differential pressure when the head of the coolant pump is suitably low, that is, when the flow rate of coolant is low during the initial start-up compared to the conventional demineralizer, and thus it is possible to ensure the electrical safety during the initial start-up.

Further, while the thickness of the ion resin layer is suitably reduced, the area of the ion resin layer (i.e., the inner circumferential area of the first flow chamber) through which the coolant can pass is considerably increased, which considerably increases the effect of filtering ions.

Further, according to preferred embodiments of the present invention, since the thickness of the filter member, through which the coolant passes can be suitably reduced to the extent that it does not affect the filtering performance, it is possible to suitably reduce the amount of ion resin used compared to the conventional demineralizer, and thus it is possible to reduce the manufacturing cost and the weight of the demineralizer.

Further, since the filtering is performed over the entire region of the filter member using the ion resin, it is possible to suitably prevent the waste of the ion resin, thus reducing the maintenance costs.

Further, according to the hollow demineralizer of the present invention as described herein, the coolant through holes, through which the coolant is suitably introduced into the ion resin layer, have different sizes along the flow direction of the coolant in the filter member, and thereby the flow of coolant can be uniformly distributed over the entire region of the filter member. Accordingly, the reduction in differential pressure and the reduction in electrical conductivity are suitably maximized, the effect of filtering ions is increased, and the replacement period is extended.

Further, according to preferred embodiments of the present invention, since the vortex generating member, which can generate a vortex of the coolant over the entire region of the filter member (first flow chamber) in which the ion resin is filled, is provided such that the coolant moves along the first flow chamber, the flow of coolant can be uniformly distributed over the entire region of the filter member in the longitudinal direction, and the ion resin can be uniformly used over the entire region of the filter member.

Accordingly, as a result, the effect of filtering ions can be suitably increased by the uniform use of the ion resin, the durability and the replacement period of the demineralizer can be extended by the uniform flow distribution, and the maintenance costs can be suitably reduced.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A coolant demineralizer for a fuel cell vehicle, the coolant demineralizer comprising:
    a housing including an inlet port and an outlet port; and
    a hollow filter member, in which an ion resin is filled, including a first flow chamber mounted in the housing and connected to the inlet port of the housing;
    wherein a second flow chamber is formed on the outside of the filter member in the housing and connected to the outlet port such that coolant introduced into the first flow chamber through the inlet port passes through the filter member in a radial direction to be filtered and is then discharged through the second flow chamber and the outlet port, and
    wherein the filter member comprises a plurality of coolant through holes formed on an inner surface of the filter member, through which the coolant in the first flow chamber is introduced into the ion resin, each of the coolant through holes having a different size in each position in a longitudinal direction of the first flow chamber such that the flow of coolant is uniformly distributed over the entire region of the filter member,
    wherein the coolant through hole, which is located adjacent to the inlet port, has a large size to increase an area through which the coolant passes, and the coolant through hole, which is located far away from the inlet port, has a small size to reduce the area through which the coolant passes.

2. The coolant demineralizer of claim 1, wherein the filter member comprises;
    a filter frame including an inside frame and an outside frame, in which the coolant through holes are formed, which are connected by an end portion at one end thereof to form a dual pipe structure, the inside frame, the outside frame, and the end portion forming a resin filling chamber in which the ion resin is filled;
    a mesh net provided on an inner surface of each of the inside frame and the outside frame to prevent the ion resin from leaking to the outside through the coolant through holes;
    the ion resin filled in the resin filling chamber between the inside frame and the outside frame to remove ions from the coolant; and
    a filter cap fixed to the other end of the inside frame and the outside frame and sealing the resin filling chamber and the first flow chamber of the inside frame.

3. The coolant demineralizer of claim 2, wherein the filter cap is detachably connected to the filter frame by a screw to facilitate the replacement of the ion resin.

4. The coolant demineralizer of claim 2, wherein the end portion comprises an opened center to form an inlet through which the coolant is introduced into the first flow chamber.

5. The coolant demineralizer of claim 4, wherein the end portion comprises an inlet port connected to the first flow chamber and projecting from the center thereof, the inlet port being inserted into a port insertion formed to project and connected to the inlet port of the housing, and wherein an O-ring is disposed between inlet port connected to the first flow chamber and the port insertion.

6. The coolant demineralizer of claim 1, wherein the housing comprises a housing main body including the inlet port and accommodating the filter member and a housing cap for sealing the housing main body, wherein the housing cap is detachably connected to the housing main body to facilitate the replacement of the filter member.

7. The coolant demineralizer of claim 6, wherein the housing cap comprises a plurality of projections supporting the filter member and formed on an inner surface of the housing cap and a coolant path formed between the projections and connecting the second flow chamber and the outlet port.

8. The coolant demineralizer of claim 1, further comprises a vortex generating member provided inside the first flow chamber to rotate the flow of coolant, introduced through the inlet port of the housing and moving along the inside of the first flow chamber.

9. The coolant demineralizer of claim 8, wherein the vortex generating member comprises a screw formed by rolling a plate in a spiral shape.

10. The coolant demineralizer of claim 9, wherein the screw is disposed over the entire region of the first flow chamber in the longitudinal direction thereof.

11. The coolant demineralizer of claim 10, wherein one end of the screw is fixed to an inner surface of a filter cap sealing one end of the first flow chamber.

12. A coolant demineralizer for a fuel cell vehicle, the coolant demineralizer comprising:

a housing including an inlet port and an outlet port; and a hollow filter member, in which an ion resin is filled, including a first flow chamber mounted in the housing and connected to the inlet port of the housing;

wherein a second flow chamber is formed on the outside of the filter member in the housing and connected to the outlet port such that coolant introduced into the first flow chamber through the inlet port passes through the filter member in a radial direction to be filtered and is then discharged through the second flow chamber and the outlet port, and wherein the filter member comprises a plurality of coolant through holes formed on an inner surface of the filter member, through which the coolant in the first flow chamber is introduced into the ion resin, each of the coolant through holes having a different size in each position in a longitudinal direction of the first flow chamber such that the flow of coolant is uniformly distributed over the entire region of the filter member, wherein the filter member comprises;

a filter frame including an inside frame and an outside frame, in which the coolant through holes are formed, which are connected by an end portion at one end thereof to form a dual pipe structure, the inside frame, the outside frame, and the end portion forming a resin filling chamber in which the ion resin is filled;

a mesh net provided on an inner surface of each of the inside frame and the outside frame to prevent the ion resin from leaking to the outside through the coolant through holes;

the ion resin filled in the resin filling chamber between the inside frame and the outside frame to remove ions from the coolant;

a filter cap fixed to the other end of the inside frame and the outside frame and sealing the resin filling chamber and the first flow chamber of the inside frame, and the coolant through hole formed in the inside frame, which is located adjacent to the inlet port, has a relatively large size, and the coolant through hole formed in the inside frame, which is located far away from the inlet port, has a relatively small size.

* * * * *